(12) United States Patent
Breuer et al.

(10) Patent No.: US 8,983,450 B2
(45) Date of Patent: Mar. 17, 2015

(54) METHOD AND DEVICE FOR FORWARDING MBMS CONTENTS

(75) Inventors: Volker Breuer, Bötzow (DE); Demian Martos-Riano, Berlin (DE)

(73) Assignee: Nokia Solutions and Networks GmbH & Co. KG, Munich (DE)

( * ) Notice: Subject to any disclaimer, the term of this patent is extended or adjusted under 35 U.S.C. 154(b) by 1292 days.

(21) Appl. No.: 12/312,373

(22) PCT Filed: Oct. 23, 2007

(86) PCT No.: PCT/EP2007/061374
§ 371 (c)(1),
(2), (4) Date: Sep. 7, 2010

(87) PCT Pub. No.: WO2008/055780
PCT Pub. Date: May 15, 2008

(65) Prior Publication Data
US 2010/0330980 A1    Dec. 30, 2010

(30) Foreign Application Priority Data
Nov. 7, 2006 (EP) ................................ 06023162

(51) Int. Cl.
*H04W 4/00* (2009.01)
*H04B 7/15* (2006.01)
*H04B 7/185* (2006.01)
*H04H 20/71* (2008.01)
*H04B 7/14* (2006.01)
(Continued)

(52) U.S. Cl.
CPC ............ *H04L 12/189* (2013.01); *H04B 7/2606* (2013.01); *H04W 4/06* (2013.01); *H04W 16/26* (2013.01); *H04W 84/047* (2013.01)
USPC ........ 455/422.1; 455/11.1; 455/13.1; 455/16; 370/312; 370/315

(58) Field of Classification Search
USPC ........ 370/312, 315; 455/11.1, 13.1, 16, 422.1
See application file for complete search history.

(56) References Cited

U.S. PATENT DOCUMENTS 6,272,351 B1 * 8/2001 Langston et al. ............. 455/507
6,778,521 B1 * 8/2004 Korpela et al. ............... 370/345
(Continued)

FOREIGN PATENT DOCUMENTS

| CN | 1536795 | 10/2004 |
|---|---|---|
| EP | 0 523 687 A2 | 1/1993 |
| WO | 2005/109750 A1 | 11/2005 |

OTHER PUBLICATIONS

Alcatel: "Hierarchical Network Configuration for LTE MBMS"; 3GPP TSG-RAN WG RAN2 #55; R2-063311; Nov. 2006; pp. 1-4; printed from www.3gpp.org/ftp/tsg_ran/WG2_RL2/TSGR2_56/Documents/ on May 7, 2009.
(Continued)

*Primary Examiner* — Marisol Figueroa
(74) *Attorney, Agent, or Firm* — Squire Patton Boggs (US) LLP

(57) ABSTRACT

In a radio communication system, a first network-based radio station transmits information destined for a plurality of subscriber stations. A second network-based radio station transmits messages destined for individual subscriber stations and the second network-based radio station receives by radio the information transmitted by the first network-based radio station and transmits the same.

19 Claims, 1 Drawing Sheet

(51) Int. Cl.
*H04L 12/18* (2006.01)
*H04B 7/26* (2006.01)
*H04W 16/26* (2009.01)
*H04W 84/04* (2009.01)
*H04W 4/06* (2009.01)

(56) References Cited

U.S. PATENT DOCUMENTS

| | | | |
|---|---|---|---|
| 2002/0107026 A1* | 8/2002 | Agrawal et al. | 455/453 |
| 2004/0029602 A1* | 2/2004 | Kunihiro | 455/500 |
| 2007/0004334 A1* | 1/2007 | Tsuchiyama | 455/9 |
| 2007/0097900 A1* | 5/2007 | Kim et al. | 370/318 |

OTHER PUBLICATIONS

Siemens: "E-MBMS Architecture and Scenarios"; 3GPP TSG RAN WG3 #53bis, R3-061539, Oct. 2006; pp. 1-2, printed on May 7, 2009 from www/3gpp.org/ftp/tsg_ran/WG3_Iu/TSGR3_53bis/docs/.
International Search Report for Application No. PCT/EP2007/061374; mailed Jan. 31, 2008.
English Translation of Chinese Office Action mailed Mar. 21, 2012 issued in corresponding Chinese Patent Application No. 200780049413.7.

* cited by examiner

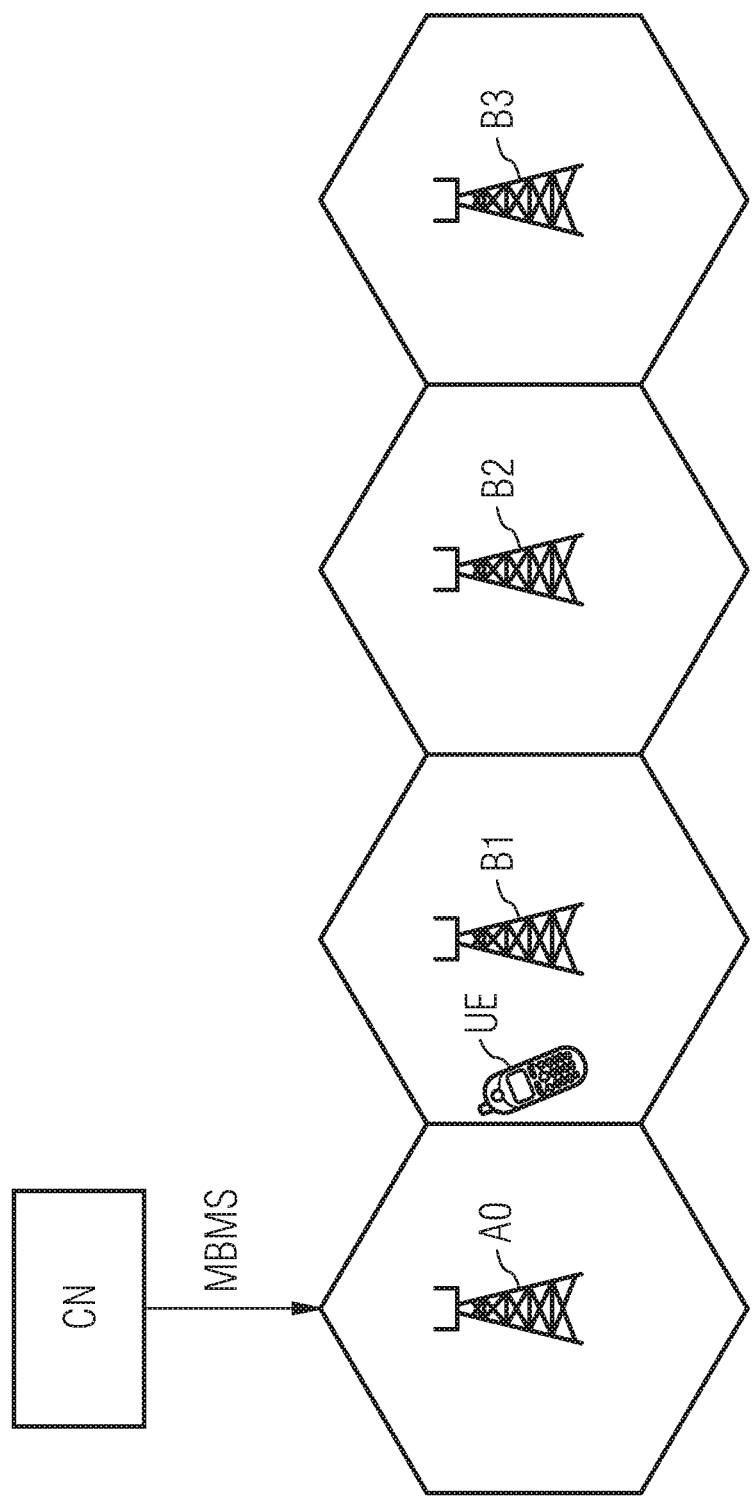

METHOD AND DEVICE FOR FORWARDING MBMS CONTENTS

CROSS REFERENCE TO RELATED APPLICATIONS

This application is a U.S. national stage of International Application No. PCT/EP2007/061374, filed Oct. 23, 2007 and claims the benefit thereof. The International Application claims the benefit of European Application No. 06023162 filed on Nov. 7, 2006, both applications are incorporated by reference herein in their entirety.

BACKGROUND

Described below is a method for the operation of a radio communication system, wherein a network-end radio station transmits information intended for a plurality of subscriber stations.

In radio communication systems, messages, for example voice information, image information, video information, SMS (Short Message Service), MMS (Multimedia Messaging Service) or other data are transmitted with the aid of electromagnetic waves via a radio interface between transmitting and receiving stations. In this case, depending on the specific configuration of the radio communication system, the stations can involve various subscriber stations or network-end radio stations such as repeaters, radio access points or base stations. In a mobile radio communication system, at least some of the subscriber stations are mobile radio stations. The electromagnetic waves are emitted with carrier frequencies that lie in a frequency band provided for the respective system.

Present-day mobile radio communication systems are often embodied as cellular systems e.g. according to the standard GSM (Global System for Mobile Communication) or UMTS (Universal Mobile Telecommunications System) with a network infrastructure including e.g. base stations, devices for controlling the base stations and further network-end devices. A further example is broadband networks having wireless access for example in accordance with IEEE 802.16. Future mobile radio communication systems may be e.g. further developments of UMTS, referred to as LTE (Long Term Evolution), or fourth-generation systems, and also ad hoc networks. Apart from wide-area organized (supralocal) cellular, hierarchical radio networks, there are wireless local area networks (WLANs) having a radio coverage area that is generally spatially delimited to a significantly greater extent. Examples of various standards for WLANs are HiperLAN, DECT, IEEE 802.11, Bluetooth and WATM.

In radio communication systems, subscriber stations' access to the shared transmission medium is regulated by multiple access (MA) methods/multiplex methods. In the case of these multiple accesses, the transmission medium can be divided among the subscriber stations in the time domain (Time Division Multiple Access, TDMA), in the frequency domain (Frequency Division Multiple Access, FDMA), in the code domain (Code Division Multiple Access, CDMA), or in the space domain (Space Division Multiple Access, SDMA). Combinations of multiple access methods are also possible, such as e.g. the combination of a frequency division multiple access method with a code division multiple access method.

In the downlink direction, that is to say from a network-end radio station to subscriber stations, information can be transmitted via point-to-point channels to individual subscriber stations or via point-to-multipoint channels simultaneously to a plurality of subscriber stations. Examples of services wherein a plurality of subscriber stations are addressed simultaneously by one message are DVB-H (Digital Video Broadcasting-Handhelds), DMB (Digital Multimedia Broadcasting) and MBMS (Multimedia Broadcast Multicast Service).

SUMMARY

The method is for communication by radio, using a network-end radio station and a corresponding radio communication system wherein information is transmitted from a network-end radio station to a group of subscriber stations.

In the method for operating a radio communication system, a first network-end radio station transmits information intended for a plurality of subscriber stations. A second network-end radio station transmits messages intended for individual subscriber stations. The second network-end radio station receives by radio the information transmitted by the first network-end radio station and transmits the information.

Communication in the downlink direction will be considered, that is to say radio transmissions from network-end radio stations to subscriber stations. In this case, a distinction can be made between the transmission of information intended for a plurality of subscriber stations, and message transmissions for an individual subscriber station. The latter are so-called unicast or point-to-point communications. In this case, the addressee of a message is respectively only an individual subscriber station. In addition to each unicast connection in the downlink direction, there may also exists a connection in the uplink direction. By contrast, the transmission of the information involves a broadcast or multicast transmission. The addressee of the information is not an individual subscriber station, but rather e.g. all subscriber stations subscribed to a specific service. Despite the information being intended for a plurality of subscriber stations, it is possible that occasionally only an individual subscriber station receives the information transmitted by a network-end radio station.

The information is transmitted by the first and also by the second network-end radio station. In this case, the second network-end radio station receives from the first network-end radio station beforehand by radio the information transmitted by the second network-end radio station. Consequently, the information transmitted by the first network-end radio station is received not only by subscriber stations but also by the second network-end radio station. As a result of its own transmission of the received information, the second network-end radio station carries out forwarding of the information; the second network-end radio station therefore functions as a relay station or repeater with regard to the information. This may not apply to the message transmission to individual subscriber stations by the second network-end radio station, that is to say that the second network-end radio station does not receive from the first network-end radio station by radio the messages transmitted to individual subscriber stations by the second network-end radio station. These messages are advantageously transmitted to the second network-end radio station via conduction from another network-end device.

The information may not altered by the second network-end radio station prior to transmission. In this case, the information transmitted by the first network-end radio station and the information transmitted by the second network-end radio station are identical. As an alternative to this, however, it is possible for the second network-end radio station to add something to the information prior to transmission or not to transmit parts of the information.

In a development, a subscriber station receives the information from the first and the second network-end radio station and combines the information. The transmission of the information by the first and the second network-end radio station and therefore also the reception by the subscriber station may take place approximately simultaneously; on account of the forwarding of the information by the second network-end radio station, the transmission by the second network-end radio station takes place after the transmission by the first network-end radio station. Combination of the doubly received information by the subscriber station can be effected in various ways, such as e.g. by selecting that information which the subscriber station received with higher quality, or by calculating new information from the doubly received information.

It is particularly advantageous if the first network-end radio station receives the information prior to transmission via conduction from a network-end device. In this case, the way in which the first network-end radio station receives the information to be transmitted by it differs from the way in which the second network-end radio station receives the information to be transmitted by it.

In a configuration, the first and the second network-end radio station use the same radio frequency for the transmission of the information. It is advantageous if the transmissions by the first and the second network-end radio station also do not differ with regard to other radio resources such as code and approximately also time. This enables constructive superimposition of the information at the location of a receiver.

In a development, the transmission of the information by the second network-end radio station is controlled by the first network-end radio station, and/or by a control device connected to the first and the second network-end radio station, and/or by the second network-end radio station. In this case, the control can include one or more of the following parameters: a determination of a transmission power to be used by the second network-end radio station for the transmission of the information; a determination of radio resources to be used by the second network-end radio station for the transmission of the information, such as e.g. frequency and/or time and/or space and/or code; a determination of a transmission direction to be used by the second network-end radio station for the transmission of the information; a determination concerning the type and/or the scope of the information to be transmitted by the second network-end radio station. The latter is expedient particularly when the second network-end radio station is not intended to transmit the received information in principle, but rather only under specific conditions such as e.g. the presence of a subscriber station, or when the network-end radio station is intended to transmit only part of the received information. If the control is not effected, or not only effected, by the second network-end radio station, then an instruction message specifying the respective determination can be transmitted to the second network-end radio station. If the instruction message originates from the first network-end radio station, then it can be transmitted by radio; if it originates from a network-end control device, then it may be transmitted by conduction.

The control is effected using at least one communication that may be received by the second network-end radio station and originates from a subscriber station. The communication can concern e.g. the whereabouts of the subscriber station or the desire to receive the information. If the control is not effected, or not only effected, by the second network-end radio station, then the second network-end radio station can forward the communication or communications received by it to the relevant control entity.

In a configuration, the second network-end radio station using the information transmitted by the first network-end radio station, carries out a synchronization between the first network-end radio station and the second network-end radio station. In this case, the second network-end radio station can gather synchronization information from the information. This synchronization can concern the frequency and/or the time.

In accordance with a development, the second network-end radio station transmits notification information to subscriber stations concerning the possibility of the transmission of the information by the second network-end radio station. It is particularly advantageous if the second network-end radio station gathers the content of the notification information from the information transmitted by the first network-end radio station. In this case, the notification information is transmitted by the second network-end radio station on the basis of its reception of the information transmitted by the first network-end radio station.

It is advantageous if the first network-end radio station also transmits messages intended for individual subscriber stations. Consequently, the first and the second network-end radio station can be identical with regard to their functionality for communication with individual subscriber stations.

The second network-end radio station can transmit the information in the direction toward the first network-end radio station. It is thereby possible to bring about an amplification of the information between the first and the second network-end radio station. A transmission in the direction toward the first network-end radio station can take place e.g. by an omnidirectional transmission; a directional transmission oriented to the first network-end radio station is also possible. As an alternative, the second network-end radio station can transmit the information directed in a direction away from the first network-end radio station.

In a development, a third network-end radio station transmits messages intended for individual subscriber stations, receives by radio the information transmitted by the second network-end radio station, and transmits the information. This gives rise to a forwarding chain for the information: the first jump corresponds to the transmission between the first and the second network-end radio station, and the second jump corresponds to the transmission between the second and the third network-end radio station. A larger number of jumps can be used.

The information may be MBMS information. The MBMS service is described e.g. in 3GPP TS 22.146 ("Multimedia Broadcast/Multicast Service"), and in 3GPP TS 22.246 ("MBMS User Services").

A network-end radio station may transmit messages intended for individual subscriber stations, receive via radio information transmitted by another network-end radio station that is intended for a plurality of subscriber stations, and transmits the received information.

The radio communication system may have at least a first and a second network-end radio station. The first network-end radio station transmits information intended for a plurality of subscriber stations, while the second network-end radio station transmits messages intended for individual subscriber stations. The second network-end radio station receive by radio the information transmitted by the first network-end radio station, and transmit the received information.

The network-end radio station and the radio communication system described below are suitable in particular for carrying out the method, including the configurations and developments.

BRIEF DESCRIPTION OF THE DRAWINGS

These and other aspects and advantages will become more apparent and more readily appreciated from the following description of an exemplary embodiment, taken in conjunction with the accompanying drawings of which:

FIG. 1 is a block diagram of part of a cellular radio communication system.

DETAILED DESCRIPTION OF THE PREFERRED EMBODIMENT

Reference will now be made in detail to the preferred embodiments, examples of which are illustrated in the accompanying drawings, wherein like reference numerals refer to like elements throughout.

The method can be applied to various types of radio communication systems. A mobile radio communication system according to the UMTS standard will be considered below as a specific example. However, the method is not restricted to systems of this type; in particular, the mobile radio communication system under consideration can also be a system in accordance with a further development of UMTS, referred to as LTE (Long Term Evolution). The excerpt from a cellular radio communication system illustrated in FIG. 1 shows the radio cells of the network-end radio stations A0, B1, B2 and B3. Further radio cells can be present, which are not illustrated in FIG. 1 for reasons of clarity.

The network-end radio stations A0, B1, B2 and B3 each communicate with subscriber stations. The subscriber station UE is illustrated by way of example in the radio cell of the network-end radio station B1. Only communication in the downlink direction is considered below, that is to say message transmissions from the network-end radio stations A0, B1, B2 and B3 to subscriber stations. In this case, different services are made available to the subscriber stations. These involve, inter alia, services with unicast or point-to-point connections. In the case of these services, the network-end radio stations A0, B1, B2 and B3 transmit messages that are respectively intended for individual subscriber stations. By way of example, telephone calls are transmitted via unicast connections. In this case, the radio resources are allocated in a manner dedicated to individual subscriber stations.

In addition to the unicast services, subscriber stations can utilize the MBMS service (Multimedia Broadcast Multicast Service). This involves a broadcast or multicast service, that is to say that the MBMS contents are not made available to individual subscriber stations, but rather to a group of subscriber stations. An MBMS content is transmitted only once in each radio cell, in a manner intended for all the subscriber stations of the MBMS group that are situated in the radio cell. The MBMS contents include, in particular, multimedia data such as e.g. TV data or MMS data (MMS: Multimedia Messaging Service).

The same frequency band is used for the transmission of the MBMS contents in the radio cells of the network-end radio stations A0, B1, B2 and B3. Separation of the MBMS contents transmitted in one radio cell from the MBMS contents transmitted in another radio cell by separation methods such as e.g. CDMA or TDMA is not effected, since the same information is involved. Furthermore, the MBMS contents are transmitted approximately simultaneously in the various radio cells, such that no undesirable interference occurs between the transmissions in the various radio cells.

FIG. 1 illustrates the case where the network-end radio station A0 receives the MBMS contents MBMS from the core network CN. In this case, the transition between the core network CN and the network-end radio station A0 can be effected in a manner known per se. By contrast, the MBMS contents MBMS are not made available to the network-end radio stations B1, B2 and B3 by the core network CN. This differentiation between the network-end radio station A0, on the one hand, and the network-end radio stations B1, B2, B3 on the other hand, with regard to the linking to the core network CN holds true only for the MBMS contents MBMS. The messages to be transmitted by unicast are also received by the network-end radio stations B1, B2, B3 directly from the core network CN.

The network-end radio station A0 transmits the MBMS contents MBMS received from the core network CN. The network-end radio station B1 receives the MBMS contents MBMS transmitted by the network-end radio station A0 and forwards the contents. In this case, forwarding is understood to mean the transmission of the MBMS contents MBMS in the customary manner for the MBMS service, in particular using the radio resources available for MBMS. The forwarding of the MBMS contents MBMS by the network-end radio station B1 is effected rapidly, such that the transmissions of the MBMS contents MBMS by the network-end radio stations A0 and B1 are effected approximately simultaneously. The delay which occurs as a result of forwarding is of the order of magnitude of a multipath delay. The different transmissions of the MBMS contents MBMS are therefore synchronized. If the subscriber station UE therefore receives the MBMS contents MBMS both from the network-end radio station A0 and from the network-end radio station B1, it can jointly process these two superposed signals. Such joint processing or combination of received MBMS contents MBMS increases the quality of the MBMS contents MBMS for the subscriber station UE.

The network-end radio station B2 receives the MBMS contents MBMS transmitted by the network-end radio station B1 and forwards the contents; furthermore, the network-end radio station B3 receives the MBMS contents MBMS transmitted by the network-end radio station B2 and forwards the contents. For the forwardings by the network-end radio stations B2 and B3, the explanations given with regard to the network-end radio station B1 are correspondingly applicable.

Various methods can be used for the forwarding of the MBMS contents MBMS. One advantageous technical implementation is for the transmission power with which the forwarding network-end radio station transmits the MBMS contents MBMS to be higher than the received strength of the MBMS contents MBMS at the location of the forwarding network-end radio station (Amplify and Forward).

The frequency band used for the MBMS contents MBMS may be separated from the frequency band used for the transmission of the unicast information by a guard band. The guard band can be e.g. a few 10 MHz wide. This makes it possible for the forwarding network-end radio stations B1, B2 and B3 to receive the MBMS contents MBMS without disturbing interference by other signals, in particular also by dedicated unicast communications.

There thus exist network-end radio stations to which the MBMS contents MBMS are made available directly from the core network CN, and also other network-end radio stations that receive and forward the MBMS contents MBMS from another network-end radio station. This has the advantage of requiring less connection capacity between the core network CN and network-end radio stations, whereby the OPEX (Operational Expenditures) of the radio communication system are reduced.

For this general principle there are a large number of specific configurations, some of which are mentioned by way of example below:

- All the network-end radio stations A0, B1, B2, B3 which transmit the MBMS contents MBMS additionally make available unicast connections to subscriber stations.
- The network-end radio stations B1, B2, B3 which transmit the MBMS contents MBMS by forwarding are network-end radio stations which additionally make available unicast connections to subscriber stations. The network-end radio station A0 which receives the MBMS contents MBMS directly from the core network CN is not available for unicast connections to subscriber stations.
- The range of the transmission of the MBMS contents MBMS by the network-end radio station A0 is greater than the range of the forwardings. Accordingly, there is a greater distance between the network-end radio station A0 and the first forwarding network-end radio station B1 than between the individual forwarding network-end radio stations B1 and B2, B2 and B3.
- The MBMS contents MBMS are not forwarded by all the network-end radio stations of the radio communication system, but rather only by a subset of the network-end radio stations. Consequently, there are network-end radio stations which do not transmit the MBMS contents MBMS.
- The MBMS contents MBMS are forwarded by different numbers of jumps. While FIG. 1 illustrates forwarding by of three jumps, other configurations according to which the forwarding takes place by of fewer or more than three jumps can additionally exist in the radio communication system. It should be taken into consideration in this case that the quality of the MBMS contents MBMS that is present at the end of the chain generally decreases with the number of jumps or the length of the chain.

Various possibilities exist with regard to the transmission direction during forwarding. In the case of a so-called "inward repetition", the forwarding network-end radio station also transmits in the direction of that network-end radio station from which it receives the MBMS contents MBMS. In this case, the subscriber station UE would for example receive the MBMS contents MBMS both from the network-end radio station A0 and from the network-end radio station B1. Accordingly, a subscriber station situated between the network-end radio stations B1 and B2 would receive the MBMS contents MBMS both from the network-end radio station B1 and from the network-end radio station B2. In the case of a so-called "forward repetition", by contrast, the forwarding network-end radio station transmits principally in the direction of the next forwarding network-end radio station. In this case, the subscriber station UE would for example receive the MBMS contents MBMS only from the network-end radio station A0. Accordingly, a subscriber station situated between the network-end radio stations B1 and B2 would receive the MBMS contents MBMS only from the network-end radio station B1.

With regard to the size of the radio coverage area of a network-end radio station, there is a difference between the transmission of the MBMS contents MBMS, on the one hand, and other transmitted information, on the other hand. In the case of the other transmitted information, attempts are made to avoid intercell interference. Therefore, the radio coverage area for this information is restricted approximately to the radio cells illustrated in FIG. 1. Such a restriction is not necessary, however, for the MBMS contents MBMS. For, as already explained, an overlap of MBMS contents MBMS transmitted by different network-end radio stations leads to an increase in quality. Moreover, the MBMS contents MBMS transmitted by a network-end radio station have to reach the next forwarding network-end radio station. Therefore, the radio coverage area of a network-end radio station with regard to the MBMS contents MBMS extends at least as far as the next forwarding network-end radio station.

The procedure according to which, for the forwarding of the MBMS contents MBMS, "normal" network-end radio stations are used rather than repeaters specially installed for this purpose has a series of advantages, which are explained in more detail below. These advantages are based on the fact that control information can be exchanged on the one hand between the forwarding network-end radio station and the network-end radio station from which it receives the MBMS contents MBMS, and on the other hand between the forwarding functionality and the "normal" functionality of a forwarding network-end radio station. In this case, the normal functionality of a forwarding network-end radio station is understood to mean the functionality not relating to the service MBMS.

In accordance with the normal functionality of a forwarding network-end radio station, the latter already has prerequisites necessary for its operation, such as e.g. power supply, linking to specific network nodes, such as e.g. to the network-end radio station from which it receives the MBMS contents MBMS, or to O&M (Operation & Maintenance) devices of the core network CN, and transmitter-end signal processing hardware and software.

From the MBMS contents MBMS received via radio, the forwarding network-end radio station can gather synchronization information, such as e.g. the beginning of the time frames of another network-end radio station. This enables synchronization between a first network-end radio station and a second network-end radio station that forwards the MBMS contents MBMS transmitted by the first network-end radio station. It is therefore possible to dispense with other synchronization mechanisms, such as e.g. the use of GPS for synchronization purposes.

The forwarding network-end radio station can furthermore gather from the MBMS contents MBMS received via radio what MBMS services are currently being offered. The forwarding network-end radio station can subsequently communicate this information to the subscriber stations within its cell by broadcast. For this broadcast, the frequency band used for the MBMS transmission and forwarding is not used, rather a frequency range used for unicast connections and transmission of general cell information is used. This obviates the need for the subscriber stations to monitor the frequency band used for the MBMS transmission and forwarding in order to find out what MBMS services are currently available.

The control of the forwarding network-end radio station with regard to its forwarding functionality includes instructions with regard to switching the forwarding functionality on and off, with regard to the transmission direction, with regard to the transmission strength of the forwardings, with regard to the type of MBMS contents MBMS to be forwarded, with regard to the type of radio resources to be used for forwarding given the use of separation methods such as FDM (Frequency Division Multiplexing), TDM (Time Division Multiplexing), CDM (Code Division Multiplexing), etc. Instructions with regard to the type of MBMS contents MBMS to be forwarded, and the use of separation methods for the MBMS transmission and forwarding are suitable in particular for the case where different MBMS services which are transmitted in the same frequency range are offered. In this case, there can be a plurality of MBMS services having the same coverage area, such as e.g. different TV programs, or alternatively MBMS services having different coverage areas, such as e.g. a national and a regional TV program.

The abovementioned control tasks concerning forwarding can be carried out centrally or in a decentralized manner. For central control, a control device such as e.g. an RNC (Radio Network Controller) or a controller specially responsible for MBMS can be responsible, which, in the example of FIG. 1, can be responsible both for the control of the network-end radio station A0 and for the control of the forwarding network-end radio stations B1, B2, B3. For decentralized control, by contrast, the network-end radio station A0, which receives the MBMS contents MBMS from the core network CN, can be responsible in the example of FIG. 1.

In addition to the above-explained central or decentralized control of a forwarding network-end radio station, inherent control by the forwarding network-end radio station is also possible. This inherent control can extend to all or else only a portion of the control tasks explained above. For the use of inherent control, it is advantageous if the forwarding network-end radio station takes account of information that it receives from subscriber stations within its radio cell. This information can indicate to the forwarding network-end radio station for example that a subscriber station desires the transmission of MBMS contents, and/or the location of a subscriber station interested in MBMS contents, and/or the type of MBMS contents desired by the subscriber station. Such information can also be used in the case of the central or decentralized control explained above. In this case, the forwarding network-end radio station communicates the relevant information received from subscriber stations to the responsible control device.

Taking account of information transmitted by subscriber stations in the control of forwarding network-end radio stations has the advantage that radio resources can be used efficiently. It is thus possible to dispense with the transmission of MBMS contents if no subscriber station interested in the MBMS contents is currently located in the relevant area. If appropriate, radio resources which at times are not required for the transmission of MBMS contents can be used for other purposes, such as e.g. for the operation of a WiMAX system.

The system also includes permanent or removable storage, such as magnetic and optical discs, RAM, ROM, etc. on which the process and data structures of the present invention can be stored and distributed. The processes can also be distributed via, for example, downloading over a network such as the Internet. The system can output the results to a display device, printer, readily accessible memory or another computer on a network.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide v. DIRECTV*, 358 F3d 870, 69 USPQ2d 1865 (Fed. Cir. 2004).

The invention claimed is:

1. A method for operating a radio communication system, comprising:
   receiving, from a first network-end radio station via a radio interface, group information intended for a plurality of subscriber stations at a second network-end radio station;
   transmitting, from the second network-end radio station, messages intended for individual subscriber stations; and
   transmitting, by the second-network-end radio station, the group information received from the first network-end radio station to an individual subscriber station, where the second network-end radio station takes into account information received from the individual subscriber station when transmitting the group information.

2. The method as claimed in claim 1, wherein the individual subscriber station receives and combines the information transmitted by the first network-end radio station and by the second network-end radio station.

3. The method as claimed in claim 2, further comprising receiving the information at the first network-end radio station, via conduction from a network-end device, prior to said transmitting of the information.

4. The method as claimed in claim 3, wherein the first network-end radio station and the second network-end radio station use a same radio frequency for transmitting the information.

5. The method as claimed in claim 4, further comprising controlling said transmitting of the information by the second network-end radio station by at least one of the first network-end radio station, the second network-end radio station and a control device connected to the first network-end radio station and the second network-end radio station.

6. The method as claimed in claim 5, wherein said controlling comprises at least one of
   determining a transmission power to be used by the second network-end radio station for said transmitting of the information,
   determining radio resources to be used by the second network-end radio station for said transmitting of the information,
   determining a transmission direction to be used by the second network-end radio station for said transmitting of the information, and
   determining a type and/or scope of the information to be transmitted by the second network-end radio station.

7. The method as claimed in claim 6, wherein said controlling is effected using at least one communication that is received by the second network-end radio station and originates from a subscriber station.

8. The method as claimed in claim 7, further comprising carrying out a synchronization, by the second network-end radio station using the information transmitted by the first network-end radio station, between the first network-end radio station and the second network-end radio station.

9. The method as claimed in claim 8, further comprising transmitting by the second network-end radio station notification information to subscriber stations concerning the possibility of said transmitting of the information by the second network-end radio station.

10. The method as claimed in claim 9, further comprising transmitting, by the first network-end radio station, messages intended for individual subscriber stations.

11. The method as claimed in claim 10, wherein said transmitting by the second network-end radio station of the information is in a direction towards the first network-end radio station.

12. The method as claimed in claim 10, wherein said transmitting by the second network-end radio station of the information is directed in a direction away from the first network-end radio station.

13. The method as claimed in claim 12, further comprising:
transmitting, by a third network-end radio station, messages intended for individual subscriber stations;
receiving by the third network-end radio station via radio the information transmitted by the second network-end radio station; and
transmitting the information by the third network-end radio station.

14. The method as claimed in claim 13, wherein the information is MBMS information.

15. A network-end radio station for a radio communication system, comprising:
means for transmitting messages intended for individual subscriber stations;
means for receiving, via a radio interface, group information, the group information intended for a plurality of subscriber stations; and
means for transmitting the group information received to an individual subscriber station,
wherein the network-end radio station takes into account information received from the individual subscriber station in association with transmission of the group information.

16. A radio communication system, having subscriber stations and first and second network-end radio stations, comprising:
a first network-end station configured to:
transmit group information intended for a plurality of the subscriber stations; and
a second network-end station configured to:
transmit messages intended for individual subscriber stations,
receive, via a radio interface, the group information transmitted by the first network-end radio station, and
transmit the group information received to an individual subscriber station, where the second network-end radio station takes into account information received from the individual subscriber station when transmitting the group information.

17. The method as claimed in claim 1, wherein the transmitting selectively sends the information to the individual subscriber terminal based on the information received from the individual subscriber station.

18. The network-end radio station as claimed in claim 15, wherein the means for transmitting selectively sends the information to the individual subscriber terminal based on the information received from the individual subscriber station.

19. The radio communication system as claimed in claim 16, wherein the means for transmitting selectively sends the information to the individual subscriber terminal based on the information received from the individual subscriber station.

* * * * *